(12) United States Patent
Shen et al.

(10) Patent No.: US 10,435,819 B2
(45) Date of Patent: Oct. 8, 2019

(54) METHOD FOR PRODUCING HIGH TENSILE STRENGTH NANOFIBER YARN

(71) Applicant: Spinnova Oy, Vaajakoski (FI)

(72) Inventors: Yingfeng Shen, Vtt (FI); Ali Harlin, Vtt (FI); Juha Salmela, Vtt (FI)

(73) Assignee: Spinnova Oy, Vaajakoski (FI)

( * ) Notice: Subject to any disclaimer, the term of this patent is extended or adjusted under 35 U.S.C. 154(b) by 0 days.

(21) Appl. No.: 15/538,931

(22) PCT Filed: Dec. 23, 2015

(86) PCT No.: PCT/FI2015/050939
§ 371 (c)(1),
(2) Date: Jun. 22, 2017

(87) PCT Pub. No.: WO2016/102782
PCT Pub. Date: Jun. 30, 2016

(65) Prior Publication Data
US 2017/0356102 A1    Dec. 14, 2017

(30) Foreign Application Priority Data
Dec. 23, 2014    (FI) ...................................... 20146148

(51) Int. Cl.
| | |
|---|---|
| *D01D 5/04* | (2006.01) |
| *B82Y 30/00* | (2011.01) |
| *C08J 3/05* | (2006.01) |
| *D01D 1/06* | (2006.01) |
| *D01D 5/06* | (2006.01) |
| *D01F 1/02* | (2006.01) |

(Continued)

(52) U.S. Cl.
CPC .............. *D01D 5/04* (2013.01); *B82Y 30/00* (2013.01); *C08J 3/05* (2013.01); *D01D 1/06* (2013.01); *D01D 5/06* (2013.01); *D01D 5/12* (2013.01); *D01F 1/02* (2013.01); *D01F 2/00* (2013.01); *D01F 9/16* (2013.01)

(58) Field of Classification Search
None
See application file for complete search history.

(56) References Cited

U.S. PATENT DOCUMENTS

| | | | |
|---|---|---|---|
| 2007/0196401 A1* | 8/2007 | Naruse ................... | A61K 8/027 424/401 |
| 2014/0058077 A1* | 2/2014 | Laukkanen ............ | B82Y 30/00 536/56 |
| 2014/0308862 A1 | 10/2014 | Heinzman | |

FOREIGN PATENT DOCUMENTS

| | | |
|---|---|---|
| EP | 2558624 A2 | 2/2013 |
| JP | H09157939 A | 6/1997 |

(Continued)

OTHER PUBLICATIONS

Office action of Japanese application 2017-552239 issued by Japanese Patent Office dated Feb. 13, 2018.

(Continued)

*Primary Examiner* — Jacob T Minskey
(74) *Attorney, Agent, or Firm* — Berggren LLP

(57) ABSTRACT

The present invention relates to a process for producing high tensile strength nanofiber yarn by wet-extrusion on a slippery surface. In particular, the present invention discloses a method wherein individual nanocellulose fibers are aligned by high speed in-nozzle-alignment and on-surface-alignment, which comprise controlling the fiber width on a moving slippery surface.

15 Claims, 2 Drawing Sheets

(51) Int. Cl.
    *D01F 2/00*     (2006.01)
    *D01D 5/12*     (2006.01)
    *D01F 9/16*     (2006.01)

(56) References Cited

FOREIGN PATENT DOCUMENTS

| | | | |
|---|---|---|---|
| JP | 2011-208015 A | 10/2011 | |
| JP | 2013-118051 A | 6/2013 | |
| WO | 2010043889 A1 | 4/2010 | |
| WO | 2013-122209 A1 | 8/2013 | |
| WO | 2014065747 A1 | 5/2014 | |

OTHER PUBLICATIONS

Iwamoto S, et al.; Structure and Mechanical Properties of Wet-Spun Fibers from Natural Cellulose Nanofibers, Biomacromolecules 2011, 12, 831-836.
Finnish Patent and Registration office, International search report with Written Opinion of PCT/FI2015/050939, dated Apr. 22, 2016.
Håkansson Karl et al., Hydrodynamic alignment and assembly of nanofibrils resulting in strong cellulose filaments, Nature Communications, Jun. 2, 2014.
Walther Andreas et al., Multifunctional High-Performance Biofibers Based on Wet-Extrusion of Renewable Native Cellulose Manofibrils, Wiley-VCH Verlag GmbH, Adv. Matter. 2011, 23, pp. 2924-2928.
Finnish Patent and Registration Office, Office Aaction and search report of the priority application FI20146148, dated Aug. 7, 2015.

\* cited by examiner

METHOD FOR PRODUCING HIGH TENSILE STRENGTH NANOFIBER YARN

PRIORITY

This application is a U.S national application of the international application number PCT/FI2015/050939 filed on Dec. 23, 2015 and claiming priority of Finnish national application FI20146148 filed on Dec. 23, 2014, the contents of all of which are incorporated herein by reference.

FIELD OF THE INVENTION

The present invention relates to a method for producing high tensile strength nanofiber yarn. Particularly, the present invention provides a method for producing such nanofiber yarn at high speed.

DESCRIPTION OF RELATED ART

Natural cellulose fiber has been utilized by human for thousands of years. Two major examples are paper from wood pulp and fabrics from cotton. In the last hundred years, synthetic fiber has gradually taken over due to its lower cost and excellent properties. However, for sustainable usage of earth resources, natural cellulose fibers have triggered more and more attraction. Wood is one of the most abundant sources of natural fiber. It was found that wood pulp can be disintegrated into nano fibrils through simple mechanical grinding. The tensile strength of nanocellulose fibril is estimated to be 2-3 GPa (Walther et al.), rendering it five times stronger than mild steel. Theoretically, it would be possible to align the nanofibers and produce long and strong fibers, surpassing that of wood and cotton (400-600 MPa). This would greatly extend the use of wood to a higher value market. Considering the global shortage of cotton, this could be an interesting alternative. This kind of long fiber is also different from regenerated cellulose fiber. Since no dissolution is used, the cellulose will mostly likely retain its cellulose I structure, thus more closely resemble the properties of cotton. For the sake of simplicity, we call this kind of fiber as nano fiber yarn.

Three research groups have published results of producing nanofiber yarn from natural cellulose nanofibers. Long fibers were prepared by Walther et al. by a simple wet-extrusion and acetone coagulation process of hydrogels of native cellulose nanofibrils. The resulting NFC macrofibers demonstrate mechanical properties combining stiffness (22.5 GPa) and strength (275 MPa) with toughness (work of fracture 7.9 MJ m$^{-3}$). Writers foresee that the properties can be increased by a further alignment of the constituent NFC nanofibrils by post drawing processes. Aside from mechanical robustness, article describes how to achieve transparent macrofibers and to control the water sorption by hydrophobization of the surface.

Iwamoto et al. has published research results of wet-spun fibers made from natural cellulose nanofibers. Cellulose nanofibers were prepared by TEMPO-mediated oxidation of wood pulp. The cellulose nanofiber suspension in water was spun into an acetone coagulation bath. The wood spun fibers at 100 m/min had a Young's modulus of 23.6 GPa, tensile strength of 321 MPa, and elongation at break of 2.2%. The Young's modulus of the wood spun fibers increased with an increase in the spinning rate because of the nanofiber orientation effect.

Håkanson et al. present a process combining hydrodynamic alignment with a dispersion-gel transition that produces homogeneous and smooth filaments from a low-concentration dispersion of cellulose nanofibrils in water. The hydrodynamic alignment was accomplished in a flow-focusing channel system. The preferential fibril orientation along the filament direction can be controlled by the process parameters. The specific ultimate strength is considerably higher than previously reported filaments made of cellulose nanofibrils; maximum tensile strength value is ~580 MPa and maximum Young's modulus 18.3 GPa. The strength is even in line with the strongest cellulose pulp fibers extracted from wood with the same degree of fibril alignment.

WO 2010/043889 A1 relates to a method for spinning of a fibre comprising cellulose nanofibrils being aligned along the main axis of the fibre from a lyotropic suspension of cellulose nanofibrils, wherein the alignment is achieved through extension of the extruded fibre and the fibre is dried under extension and the aligned nanofibrils aggregate to form a continuous structure. Similarly, also EP 2 558 624 B1 relates to a continuous method for manufacturing cellulose based fibers of cellulose nanofibrils. However, these documents do not disclose for example a method for producing high tensile strength nanofiber yarn at exceptionally high speed.

Cellulose has been used widely as a raw material for textile and composite reinforcement fibers. Currently chemical processes, such as dissolving and regeneration as well as cellulose derivatization are used. These methods however require chemicals and consume rather much energy. Thus, there is a need for simpler processes, which consume less chemicals and less energy, for producing long nanocellulose fibers with good mechanical properties preferably at high speed.

SUMMARY OF THE INVENTION

It is an object of the present invention to utilize physical means to assemble cellulose nanofibers in order to produce high tensile strength long fibers i.e. nanofiber yarn.

Particularly, it is an object of the present invention to provide a method based on aligning individual nanocellulose fibers for producing high tensile strength nanofiber yarns at a high speed, which method uses less chemicals and less energy compared to traditional chemical processes.

These and other objects, together with the advantages thereof over known techniques are achieved by the present invention, as hereinafter described and claimed.

The method according to the present invention is mainly characterized by what is stated in the characterizing part of claim 1.

The present invention provides advantages over known methods, since it e.g. allows the usage of low cost raw material such as non-modified nanocellulose. Upgrading of the raw-material to TEMPO-oxidized nanocellulose furthermore improves the mechanical properties of the fibers. In addition, the present method is able to produce nano fiber yarns continuously at a high speed, because the method does not use a traditional coagulation bath.

Next, the present technology will be described more closely with the aid of to the appended drawings and with reference to a detailed description.

DETAILED DESCRIPTION OF EMBODIMENTS

The present invention discloses a method for producing high tensile strength nanofiber yarn by wet-extrusion.

Nanofibers are defined in the art as fibers with diameters less than 100 nanometers. In textile industry, this definition is often extended to include fibers as large as 1000 nm diameter. Yarn on the other hand is a long continuous length of interlocked fibres, herein nano fibers, suitable for use e.g. in the production of textiles.

Particularly, the present invention is based on the combination of in-nozzle-alignment and on-surface-alignment, wherein individual nanocellulose fibers are aligned together by using high speed extrusion and simultaneous stretching technique in a wet state.

According to an embodiment of the invention, the method for producing high tensile strength nanofiber yarn by wet-extrusion comprises aligning individual nanocellulose fibers together and forming a nanofiber network first by in-nozzle-alignment, wherein a nanocellulose hydrogel is extruded through a nozzle at high jet speed, after which the nanofiber network is stretched by on-surface-alignment, wherein a hydrogel jet from the nozzle is applied on a moving slippery surface.

According to another embodiment, the nanocellulose hydrogel is prepared from natural and non-modified nanofibrillated cellulose. However, also TEMPO-oxidized nanocellulose may be used, which has shown further improving the properties of the fibers. One suitable source of nanocellulose is bleached birch pulp.

According to a further embodiment, the moving surface is a drum, or alike, or a belt. The surface is preferably covered with a nonporous plastic film that has been pre-coated with oil, such as a vegetable oil, or a non-immiscible fluid, in order to achieve a slippery surface. A contact angle hysteresis of less than 10° is achieved. If a porous surface is infused with lubricating fluid, even lower contact angle hysteresis (<2.5°) can be obtained. The produced fibers can then be removed from the drum together with the plastic film.

Figure 2:
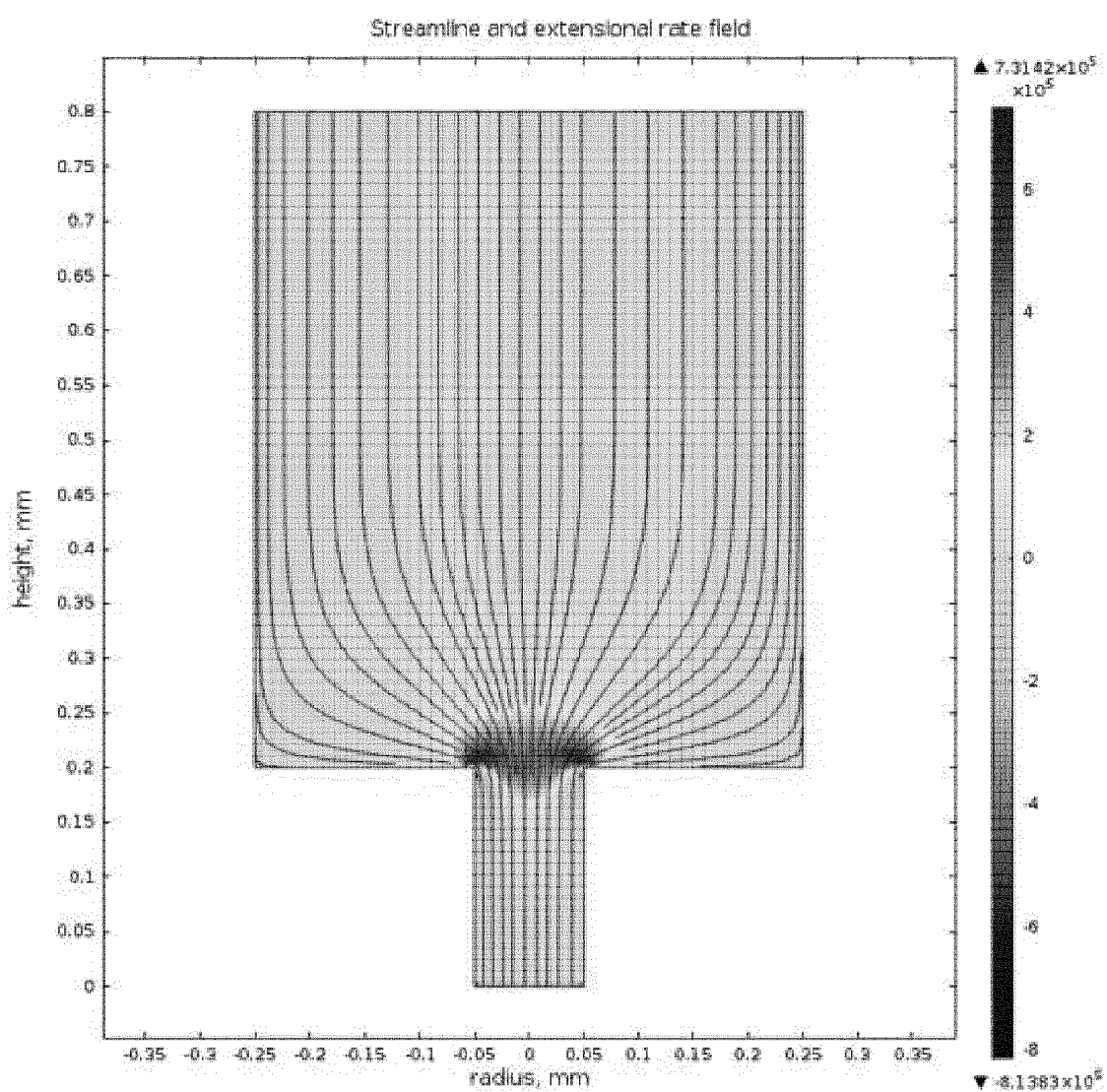
FIG. 2 is a chart figure describing the in-nozzle-alignment of the nanocellulose fibers and showing extensional rate field in the nozzle with a jet speed of 10 m/s.
Figure 3:
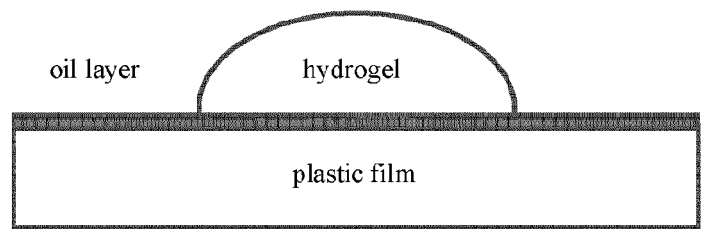
FIG. 3 is a simplified drawing demonstrating a nanocellulose hydrogel on a slippery oil surface.
Figures 4A, 5A:
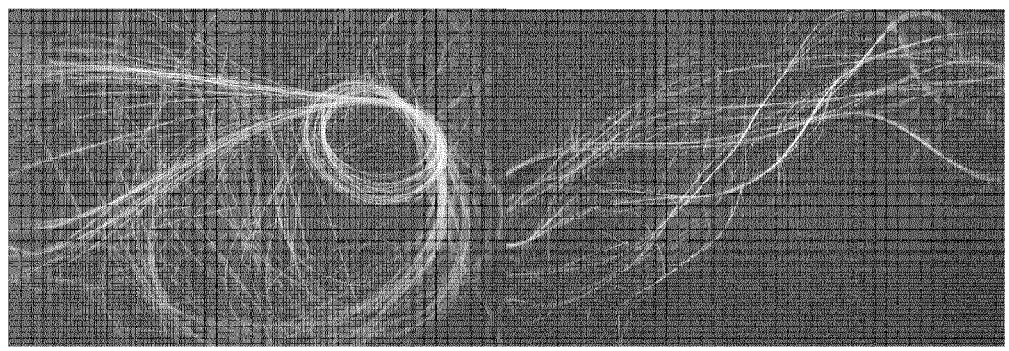
FIGS. 4a-4c and FIGS. 5a-5c are SEM-images of a produced NFC yarn(s) and TEMPO-NFC yarn(s), correspondingly. Fairly uniform fibers are formed, whereas the NFC yarns are more ribbon-like due to larger width and thickness ratio (FIGS. 4b and 4c).
Figures 4B, 5B:
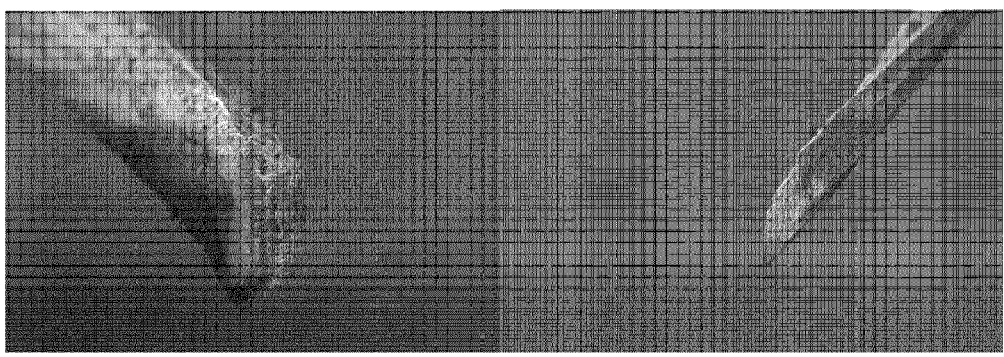
Figures 4C, 5C:
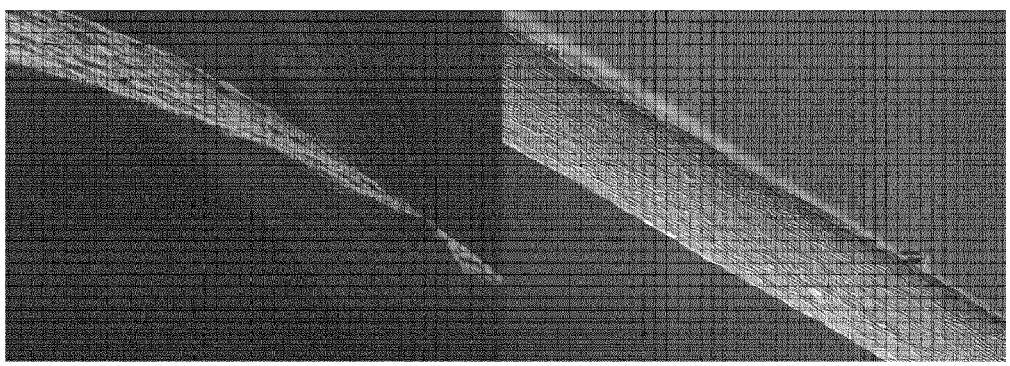

In "in-nozzle-alignment" individual nanocellulose fibers are aligned as shown in FIG. 2, which depicts the flow of nanocellulose hydrogel from a syringe, or alike, into a smaller nozzle and the forming of an extensional flow regime by the hydrogel flow. Through the interaction of a continuous water phase and a fiber network, the network is efficiently stretched along the flow direction at high extensional rate. Such high extensional rate can be obtained by using high extrusion speed i.e. jet speed and small nozzle size.

According to one embodiment, the jet speed is between 3 and 30 m/s, preferably between 10 and 25 m/s.

According to one embodiment, the nozzle has an inner diameter between 10 and 150 μm.

In "on-surface-alignment" a hydrogel jet from the nozzle is applied on a moving slippery surface, as stated above. When surface speed is higher than jet speed, the cross-sectional area of the wet filament becomes smaller after it has landed on the surface. The stretching created by the surface also enhances the fiber alignment. On the other hand, if the surface is moving slower than the jet speed, the cross-sectional area of the wet filament becomes larger and causes accumulation of the substrate. This results in reduction of orientation of the fibers in the yarns. The previously aligned fibers maybe disturbed due to the compression and strong impact with the substrate, whereas the resulting fibers become less aligned.

Another important feature is the impingement angle of the jet. The cross-section of the jet is preferably circular due to the shape of the nozzle. The vertical component of the jet speed directly causes a widening of the wet filament in cross direction. The horizontal component, depending on its speed relative to the moving substrate, may either contribute to the shrinking or stretching of the filament length. The resulting filament then obtains a ribbon like cross-section.

According to one embodiment, the hydrogel jet from the nozzle impinges on the moving surface at an impingement angle of between 90 and 20 degrees, wherein the jet is perpendicular to the surface at 90 degrees and tangential to the surface at 0 degree. According to a preferred embodiment, the impingement angle is between 90 and 40 degrees, more preferably between 75 and 55 degrees.

Compression of wet filament may be useful for gaining thick filaments having a high tensile strength. Particularly, when a thin jet impinges on a slow moving substrate, a thicker filament is formed. The number of defects due to non-uniformity can be reduced.

According to a further embodiment, the distance between the nozzle and the moving surface is short enough for enabling that a continuous water phase remains and that the wet filament formed has high uniformity. Since the wet filament on the substrate is few millimeters, such as 10 to 20 mm, away from the impingement point, it is in a low shear state. The flow of the gel is mainly driven by surface wetting, gravity, centrifugation force and shrinkage due to drying and minor water evaporation. When a high consistency hydrogel is used, the yield stress of the gel is high enough to efficiently slow down the flowing or deformation of the wet filament. As the method provides a closely packed fiber network, the disordering of the nanofibrils due to dispersion and/or lack of orientation is unlikely.

According to a preferred embodiment, the application of oil coating on the substrate has clear benefit in controlling the wet fiber width. Oil coating is used to reduce the risk of the wet fiber adhering to the substrate and thus forming wide and thin ribbons, which are quite weak due to large amount of detects. With oil coating, the wet filament shrinks for example from 1.5 mm down to as small as 10 s of microns as it is dried. This is related to the reduced contact angle hysteresis. At the same time, the thickness to width ratio of the ribbon increases and in certain cases a close to circular cross-section can be obtained.

In order to form a highly slippery surface, the applied oil should have better wettability to the surface than the nanocellulose hydrogel, which consists of mainly water. The viscosity of the oil should also be sufficiently low in order to facilitate the lubrication.

Tensile strength of the fibers increases together with stretch ratio. This is expected assuming fibers are more aligned due to stretching on the surface. According to one embodiment, the stretching ratio (=surface speed/nozzle speed i.e. jet speed) is at least 1, thus meaning that the surface moves with at least the same speed as the jet speed.

However tensile strength can also benefit from lower than 1 stretching ratio, for example when aiming for thicker filaments. According to one embodiment, the stretching ratio is at least 0.1, preferably more than 1.

Ideally, a high jet speed and a high stretch ratio should both exist for the best fiber alignment. The inventors of the present invention have noticed that the 3% hydrogel does not allow higher than 16 m/s jet speed before the nozzle is clogged or the pressure would be too high for the extruder. Only at lower solids, higher jet speed is achievable. When the consistency of the nanocellulose hydrogel is decreased e.g. from 3% to 1.64%, the operation window of stretch ratio is adversely shifted to the lower end. Higher stretch ratio would simply cause fiber to break. This in turn suggests a higher consistency. Thus, a compromise has to be made between consistency, nozzle speed and stretch ratio. Other parameters, such as humidity and drying speed, should be considered secondly.

Using the WESS (wet-extrusion on a slippery surface) process as described herein nano fiber yarn can be produced at speed between 120 and 660 m/min, which is the highest speed reported. Such speed is similar to the capacity of current paper making and coating production line, whereby conversion of the production line to fiber making is possible and furthermore improve the economy of the present method.

According to a preferred embodiment the nano fiber yarn is produced at least at a speed of 500 m/min, such as at the speed between 550 and 700 m/min and in particular at the speed of about 660 m/min.

Additionally, a high molecular weight polymer additive may be used (added to the nanocellulose hydrogel) to ease up the extrusion, i.e. to reduce the extrusion pressure and prevent nozzle clogging. One such suitable additive is a high molecular weight polyethylene oxide.

The main application area for nano fibers produced by the method as hereinbefore described is the textile industry. Such nanofibers may e.g. be used as composite reinforcement fibers or as precursors for carbon fibers.

Next, the present invention is illustrated by the following non-limiting example. It should be understood, however, that the embodiments given in the description above and in the example are for illustrative purposes only, and that various changes and modifications are possible within the scope of the claims.

Example

Preparation of Nanofibrillated Cellulose

The nano fibrillated cellulose was prepared from bleached birch pulp. The pulp slurry was passed one time through fluidizer in one pass. The solids content of the gel was 0.819%.

Viscosity Measurement

The shear thinning viscosity of the TEMPO NFC was measured on a rotary rheometer (Anton Parr). Cone and plate measurement system was used. The sample was first pre-sheared at 1500/s for 60 seconds. After pre-shearing, ramping up and down did not show apparent hysteresis.

Preparation of Slippery Surface

A polyethylene film was used as the carrier substrate and tightly wrapped on a rotating drum. Sunflower oil was coated to the substrate with a brush while the drum is rotating. The final coat weight of the oil was estimated to be 1-3 g/m$^2$.

Wet Extrusion of Nanofibrillated Cellulose

Figure 1:
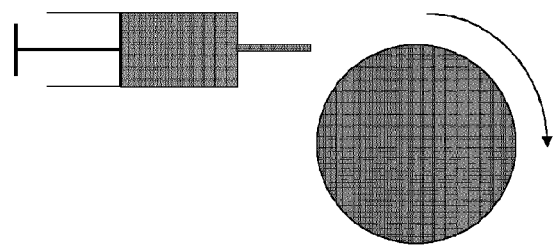
FIG. 1 is a simplified schematic drawing illustrating the process concept of a wet extrusion on a slippery surface (WESS).

The schematic of the extrusion system is shown in FIG. 1. A custom made syringe pump extruder was used to extrude the hydrogel through a syringe needle. The inner diameter of the needle was 108 μm and the length of the needle was 8 mm. The extruder was horizontally mounted on the z-axis of a CNC machine and controlled as the 4th axis. EMC2 software was used to synchronize the x-y-z motion and the extruder. The speed of the jet coming out of the nozzle can vary between 240-1920 m/min. A rotating drum was driven horizontally in front of the needle by a high speed mixer. The diameter of the drum was 104 mm. By adjusting the speed of the mixer, the surface speed of the drum varied between 120-660 m/min, which was also the speed of the fiber production.

In a typical experiment, oil coating is applied to a polyethylene film, which is attached on the rotating drum. The jet from the nozzle is then started and 10 meter of wet filament is extruded to clear up the nozzle and build up the pressure in the extruder. The nozzle then starts to move linearly along the drum. After another 10 meter of fiber is formed on the drum, the jet stops and the drum continues to rotate for a few minutes till the fibers are dried. A hot air dryer can be optionally used to shorten the drying time.

Effect of Jet Speed on the Tensile Strength of NFC Nanofiber Yarn

At lower nanocellulose consistency of 1.64%, higher jet speed up to 28 m/s can be achieved without clogging. The in-nozzle-alignment becomes more important than stretch ratio, as shown in Table 1. The maximum stretch ratio here is only 0.25. The tensile strength is however clearly higher, which is probably due to the higher jet speed. The lower consistency is believed to dilute the fiber network and reducing the entanglement between cellulose nano fibers. Table 1 below shows the influence of nozzle speed on tensile strength with an impingement angle of 55°.

TABLE 1

| Sample # | Solids % | Surface speed m/s | Jet speed m/s | Stretch ratio | Equivalent diameter, μm | Tensile strength, MPa | Standard deviation, MPa |
|---|---|---|---|---|---|---|---|
| A | 1.64 | 6 | 24 | 0.25 | 23.4 | 270 | 19 |
| B | 1.64 | 6 | 28 | 0.21 | 25.3 | 251 | 18 |
| C | 1.64 | 4 | 24 | 0.17 | 28.6 | 278 | 12 |

* Equivalent diameter is calculated from a circle with equal cross-sectional area mechanical grinding and 6 times through micro fluidizer. The resulting gel had a consistency of 1.64%. A 3% hydrogel was further prepared by using centrifugation to remove part of the water. TEMPO oxidized nanocellulose was also prepared from bleached birch pulp and fibrillated in micro Although the standard deviation of the measurement in Table 1 is rather large and does not allow strong conclusions to be made, there are two interesting observations. Comparing case A and B, a higher jet speed does not lead to higher tensile strength. It is speculated that disorder of fiber network may happen at too high shear rate, in this case the higher jet speed. This is a common phenomenon for certain thixotropic fluid that exhibits shear thinning at low shear rate and shear thickening at much higher shear rate. However, there is currently no similar observation for the rheology of nanocellulose gel in the literature. Comparing case A and C, a lower surface speed, correspondingly lower stretch ratio did not harm the tensile strength. This may actually be due to the improvement on fiber quality. Lower centrifugation force resulting from lower surface speed leads to less splashing. In fact, it is not possible to form wet fiber on the surface when the centrifugation force is too strong and the wet gel is thrown away from the rotating drum.

SEM

The yarn's microstructure was investigated using a Zeiss Merlin Field-Emission SEM. For cross sectional analysis the yarns were cooled with liquid nitrogen and fractured. For surface analysis the yarns were settled on sample stub with a carbon tape. In both cases the samples were coated with thin layer of platinum using a sputter coater. The SEM was operated using 2 kV of acceleration voltage using both secondary electron and InLens detectors.

Tensile Test

Calculation of the tensile strength requires the knowledge of the cross sectional area, which was estimated from the linear density and bulk density of the nanofiber yarn. The former was calculated from the solids content of the hydrogel, extrusion speed and surface speed. The bulk density of the dry filament was assumed as 1.5 g/cm$^3$. It was checked from the SEM cross sectional image that the estimation matches well for both NFC and TEMPO oxidized NFC. The estimation method was thus used throughout the work.

The strength of the nanofiber yarn was measured on a custom made tensile tester. The fiber was attached to a block of metal with double sided tape. The other end of the fiber was pulled up at 50 micron/second using a geared stepper motor. The span of the fiber was 30 mm. The metal block was placed on a 4 digit Precisa balance and the weight is monitored at 10 Hz through serial communication with PC. The maximum force before the fiber break was then used to calculate the tensile strength.

Humidity Control

The measurement of tensile strength was performed in a controlled climate chamber. The temperature was held constant at 22° C. The relative humidity is controlled using moistured air at different humidity level. The lowest relative humidity level that could be achieved was 14%. The highest humidity level was 90%. The tensile tester was placed inside the chamber together with the sample. The sample was stored in the chamber for at least 2 hours before each measurement.

CITATION LIST

Patent Literature

1. WO 2010/043889 A1
2. EP 2 558 624 B1

Non-Patent Literature

1. Walther A., Timonen J., Díez I., Laukkanen A., Ikkala O., "Multifunctional high-performance biofibers based on wet-extrusion of renewable native cellulose nanofibrils", Adv. Matter. 2011, 23, 2924-2928.
2. Iwamoto S., Isogai A., Iwata T., "Structure and Mechanical Properties of Wet-Spun Fibers made from Natural Cellulose Nanofibers", Miomacromolecules 2011, 12, 831-836.
3. Håkansson K. M. O., Fall A. B., Lundell F., Yu S., Krywka C., Roth S. V., Santoro G., Kvick M., Wittberg L. P., Wåberg L., Söderberg L. D., "Hydrodynamic alignment and assembly of nanofibrils resulting in strong cellulose filaments", Nature Communications 5, Article number 4018, 2014.

The invention claimed is:

1. A method for producing a high tensile strength nanofiber yarn by wet-extrusion, the method comprising the steps of:
   forming a nanofiber network by aligning together individual nanocellulose fibers from natural and nonmodified nanofibrillated cellulose in a nozzle by in-nozzle-alignment,
   preparing a nanocellulose hydrogel by extruding the nanofiber network through the nozzle at a jet speed between 4 and 32 m/s onto a moving slippery surface,
   stretching the nanofiber network obtained through the nozzle by on-surface-alignment,
   said in-nozzle-alignment being achieved through allowing the hydrogel to flow from a larger volume syringe to a nozzle having a volume at least an order of magnitude smaller than the volume of the syringe, and
   and wherein the nanofiber yarn formed by combination of the in-nozzle alignment and the on-surface alignment is air dried on the moving slippery surface after the on-surface alignment.

2. The method according to claim 1, wherein the nanofiber network is stretched along a jet flow direction through an interaction of a continuous water phase with the nanofiber network.

3. The method according to claim 1, wherein the moving surface is a drum or a belt covered with a plastic film that has been pre-coated with an oil, such as a vegetable oil, or with a non-immiscible fluid.

4. The method according to claim 1, wherein the nanofiber network is stretched at a stretching ratio of at least 0.1.

5. The method according to claim 1, wherein the nozzle has an inner diameter between 10 and 150 μm.

6. The method according to claim 1, wherein the hydrogel comprises non-modified nanocellulose fibers.

7. The method according to claim 1, wherein the hydrogel comprises TEMPO-oxidized nanocellulose fibers.

8. The method according to claim 1, wherein the hydrogel jet from the nozzle impinges on the moving surface at an impingement angle between 90 and 20 degrees, wherein the jet is perpendicular to the surface at 90 degrees and tangential to the surface at 0 degree.

9. The method according to claim 8, wherein the impingement angle is between 90 and 40 degrees.

10. The method according to claim 1, wherein a distance between the nozzle and the moving surface is such that it enables a continuous water phase and a uniform wet filament.

11. The method according to claim 1, wherein a high molecular weight polymer additive is added to the nanocellulose hydrogel to reduce extrusion pressure and prevent nozzle clogging.

12. The method according to claim 1, wherein the nanofiber network is stretched at a stretching ratio of more than 1.

13. The method according to claim 1, wherein the jet speed is between 10 and 25 m/s.

14. The method according to claim 8, wherein the impingement angle is between 75 and 55 degrees.

15. The method of claim 1, wherein the nanofiber yarn is produced at a speed of at least 500 m/min.

* * * * *